United States Patent [19]
Norris et al.

[11] Patent Number: 5,453,804
[45] Date of Patent: Sep. 26, 1995

[54] CAMERA WITH FILM PROCESSING MEANS

[75] Inventors: Philip R. Norris, North Reading; James M. Cloherty, Scituate, both of Mass.

[73] Assignee: Polaroid Corporation, Cambridge, Mass.

[21] Appl. No.: 298,842

[22] Filed: Aug. 31, 1994

[51] Int. Cl.[6] .............................. G03B 17/50; G03D 9/00
[52] U.S. Cl. ................................................ 354/83; 354/301
[58] Field of Search ...................... 354/83, 84, 85, 354/86, 87, 88, 90, 91, 92, 303, 305, 317, 318, 341, 301

[56] References Cited

U.S. PATENT DOCUMENTS

| | | | |
|---|---|---|---|
| 4,540,263 | 9/1985 | Kramer | 354/304 |
| 4,605,608 | 8/1986 | Bullitt | 430/206 |
| 4,630,912 | 12/1986 | Whiteside | 354/88 |
| 4,630,915 | 12/1986 | Whiteside et al. | 354/275 |
| 4,779,110 | 10/1988 | Stella | 354/88 |

Primary Examiner—David M. Gray
Assistant Examiner—Nicholas J. Tuccillo
Attorney, Agent, or Firm—John J. Kelleher

[57] ABSTRACT

There is presented a camera comprising a housing, and a generally cylindrically-shaped can rotatably mounted in the housing. The can is provided with an elongated opening extending lengthwise of the can, an external surface for supporting a negative film strip, and an internal surface for retaining a rolled film processing pad strip. An end of the negative film strip and an end of the processing pad strip are fixed to a foil having adhesive thereon for holding the foil on the can external surface and for covering the elongated opening to seal the can. The foil is peelable from the can and from the opening by pulling of the negative film strip from the external can surface. Movement of the foil away from the camera is operative to draw the processing pad strip from within the can while simultaneously drawing exposed negative strip from the camera, with the pad strip overlying the negative strip.

15 Claims, 13 Drawing Sheets

CAMERA WITH FILM PROCESSING MEANS

BACKGROUND OF THE INVENTION

1. Field of the Invention

The invention relates to cameras, in general, and to a "single-use" camera having means for processing film exposed therein, in particular.

2. Description of the Prior Art

Single-use, or "disposable" cameras are known in the art and have found wide-spread use in the general public. However, after exposure of the film in the single-use camera, it has been necessary to return such a camera to a developer for processing of the film.

Developing within a camera is known, but generally requires the subsequent application of a gel to the film, with the gel being spread evenly over the exposed film, a procedure not often accomplished in an optimum manner by users in picture-taking situations. Further, such gels must be sealed from the atmosphere prior to use or undergo significant deterioration in a relatively short period of time.

There is a need for a single-use camera having facility for processing exposed film in such a manner as to require no application of gel, or other matter, to the film by a user, but which automatically applies a correct amount of fresh developing material to the film, both evenly and consistently.

SUMMARY OF THE INVENTION

It is, therefore, an object of the invention to provide a camera having therein an appropriate film processing composition.

A further object of the invention is to provide such a camera wherein the film processing composition is applied evenly and consistently to exposed film without an operator's handling of the composition.

A further object of the invention is to provide such a camera wherein the processing composition is sealed from the atmosphere until immediately prior to use, to avoid deterioration of the composition.

A still further feature of the invention is to provide such a camera having a high degree of reliability in the hands of users having little knowledge of photography and which is inexpensive to produce and therefore inexpensive to the public.

With the above and other objects in view, as will hereinafter appear, a feature of the present invention is the provision of a camera comprising a housing, and a generally cylindrically-shaped container rotatably mounted in the housing. The container is provided with an elongated opening extending lengthwise of the container, an external surface for supporting a film strip and an internal surface for retaining a rolled film processing pad strip. An end of the film strip and an end of the processing pad strip are fixed to a seal member having adhesive thereon for holding the seal member on the container external surface so as to cover the elongated opening and thereby seal the container. The seal member is adapted to be pulled from the container and from the container opening by peeling of the film strip from the container, movement of the foil away from the camera being operative to draw the processing pad strip from the container while simultaneously drawing the film strip, in exposed condition, from the camera, with the pad strip overlying the film strip.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent.

In the drawings.

DESCRIPTION OF THE PREFERRED EMBODIMENT

Figure 1:
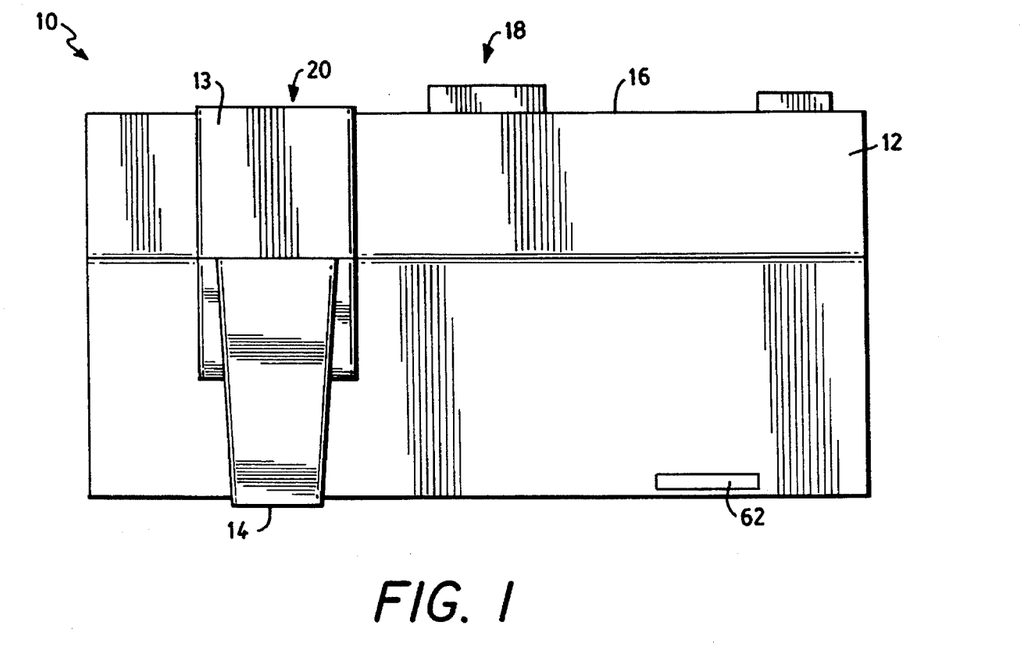
FIG. 1 is a top plan view of one form of camera illustrative of an embodiment of the invention.
Figure 2:
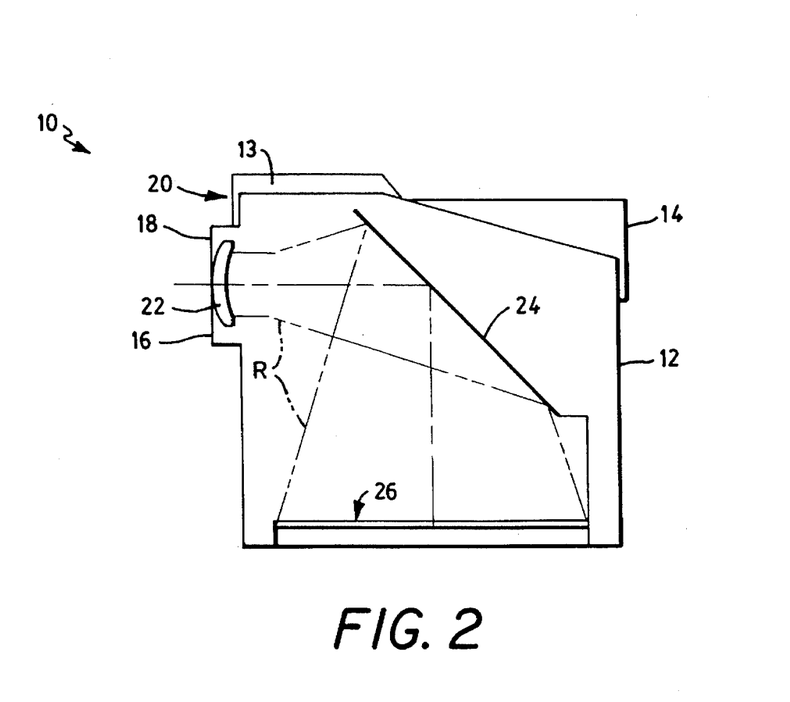
FIG. 2 is a side elevational view of the camera of FIG. 1, with scene light travel through a lens and onto an exposure plane shown diagrammatically.

Referring to FIGS. 1 and 2, it will be seen that the illustrative camera 10 includes a lighttight housing 12 and a viewfinder 13 having an eye piece 14 extending rearwardly therefrom. On front face surfaces 16 of the camera 10 there are disposed an objective lens opening 18 and a viewfinder window 20. An objective lens 22 is disposed adjacent the lens opening 18 (FIG. 2) and is adapted to direct image-carrying light rays R to a mirror 24 which reflects the light rays onto a film plane 26 which constitutes an exposure area for negative or photosensitive film.

Figure 3:
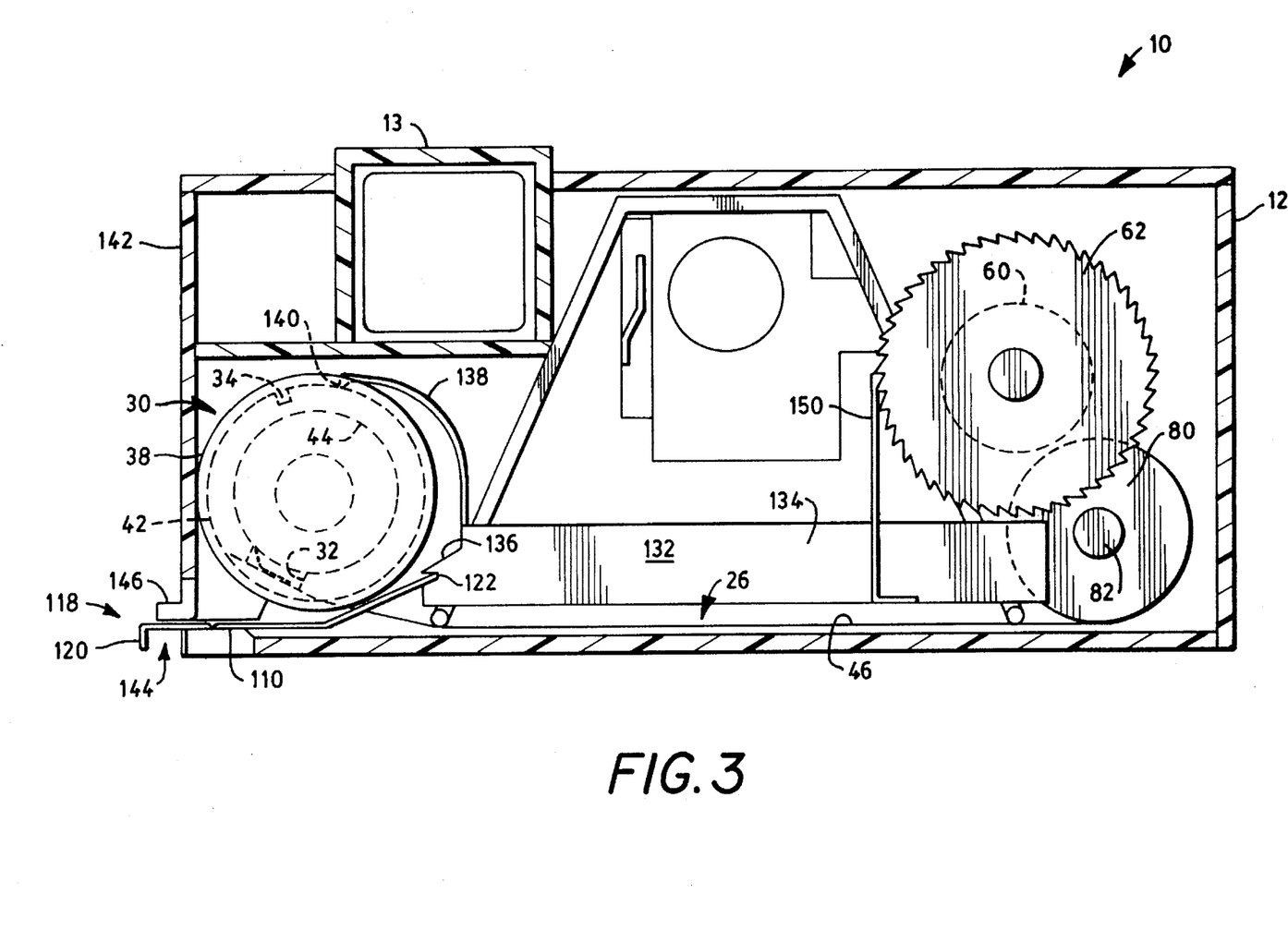
FIG. 3 is a rear elevational view of the camera of FIGS. 1 and 2, with a rear cover removed to show working components of the camera.
Figure 4:
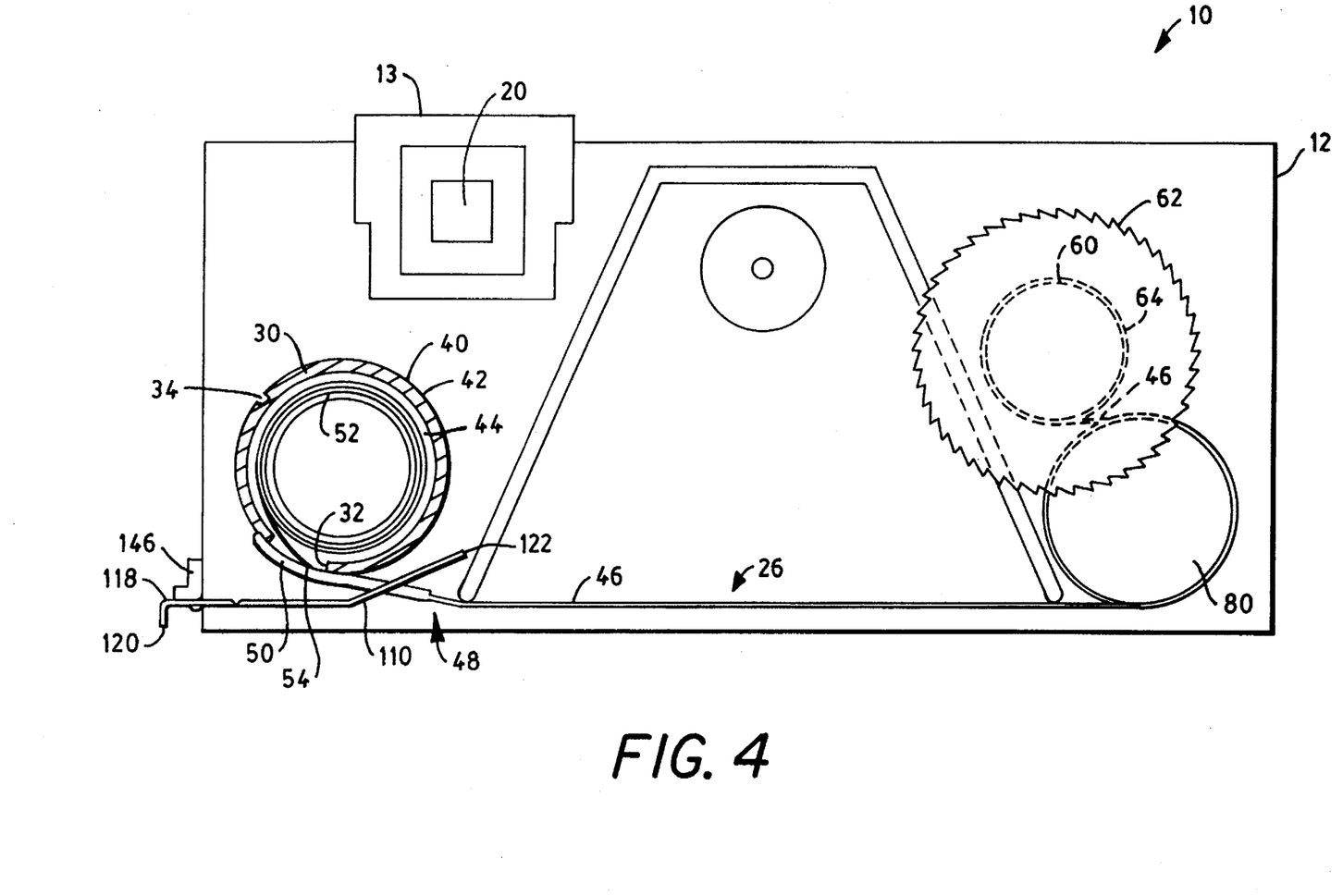
FIG. 4 is similar to FIG. 3, but simplified, and showing a film processing pad strip container component in section.
Figure 5:
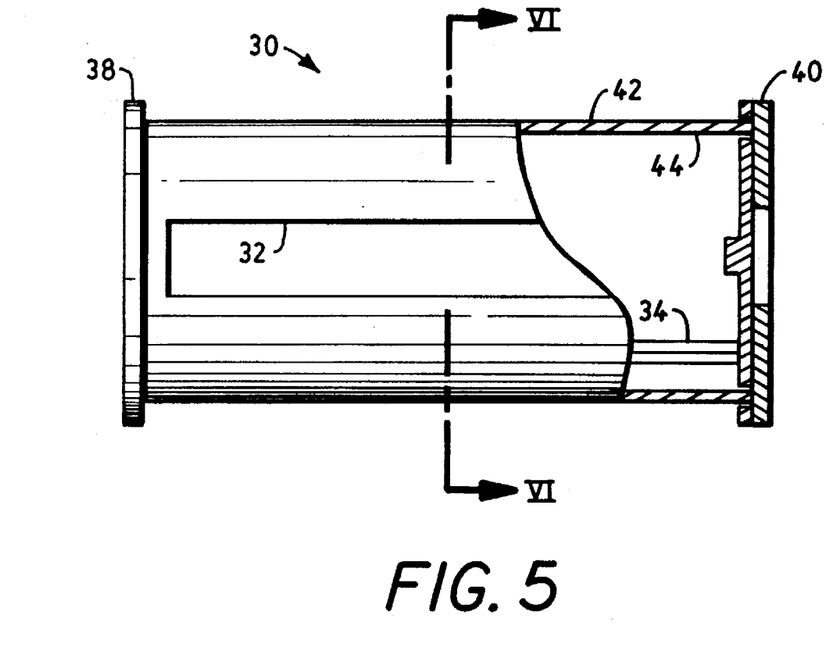
FIG. 5 is a side elevational view, broken away, of the container of FIG. 4.
Figure 6:
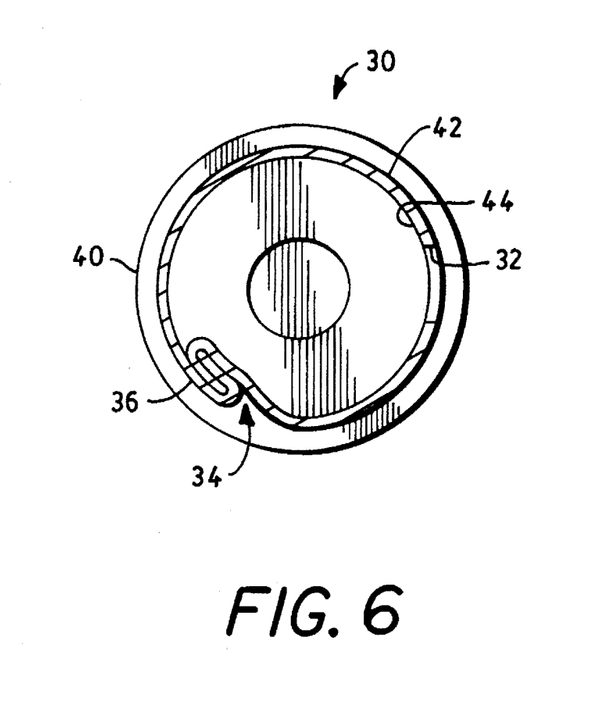
FIG. 6 is a sectional view taken along line VI—VI of FIG. 5.

As shown in FIGS. 3 and 4, there is rotatably mounted in the camera 10 a generally cylindrically-shaped container, preferably in the form of a metal can 30. In FIGS. 5 and 6, it will be seen that the can 30 includes an elongated opening 32 extending lengthwise of the can and throughout most of the length of the can. The can 30 also includes an elongated groove 34 extending substantially throughout the length of the can. The groove 34 may be formed by a side seam 36 of the can, if the can is of metal, or may be molded into the can if the can is of plastic. The can 30 is provided with end flanges 38, 40 which extend radially outwardly from an external surface 42 of the can, and is provided with an internal surface 44.

Referring to FIG. 4, it will be seen that the can external surface 42 is adapted to support a rolled negative film strip 46 thereon between the end flanges 38, 40. The negative film strip 46 is placed on the can external surface 42 and within the housing 12 of the camera 10, in the dark, during the camera assembly process. Fixed to an end 48 of the film strip 46 is a gas and water impermeable seal member, preferably in the form of a foil 50, which is adhesively fixed to the external surface 42 of the can 30 and which closes the opening 32. The primary functions of the foil 50 are to keep ambient or surrounding air from entering the can 30, while at the same time preventing moisture located within the can 30 from escaping into the surrounding atmosphere. The foil adhesive may be a heat seal material, such as a thermoplastic resin, a heat sealable PVC, or the like, and the foil 50 may be heat-sealed to the can 30. The adhesive selected must be strong enough to hold the foil in intimate contact with the external surface 42 of the can 30 but amenable to being peeled from the can surface, as will be further described herein.

Disposed within the can 30 is a rolled flexible carrier coated to the proper thickness with prespread reagent dispersed in a hydrogel. The hydrogel is of the type that contains a substantially non-viscous, aqueous alkaline photographic processing composition. This prespread reagent is hereinafter referred to as a "pad" or "pad strip". The rolled flexible carrier may or may not include an image-receiving layer. However, in the preferred embodiment of the present invention, the inclusion of an image-receiving layer is preferred.

Upon face-to-face contact with exposed film, a quantity of the processing composition contained in the hydrogel is absorbed by the film. This absorption initiates development and transfer of a latent image in the exposed film to the image-receiving layer, by means of a well-known diffusion transfer process. A carrier incorporating an image-receiving layer of the type contemplated for use with the invention herein is discussed in U.S. Pat. No. 4,605,608 issued Aug. 12, 1986, in the name of Julian G. Buillitt.

There may also be disposed in the can 30, centrally of the pad 52, a core member 56 (FIG. 14), which may be a rigid insert member for support of the pad 52, or may be of an elastomeric, or the like, material carrying an agent for preservation of the freshness of the pad 52.

Figure 14:
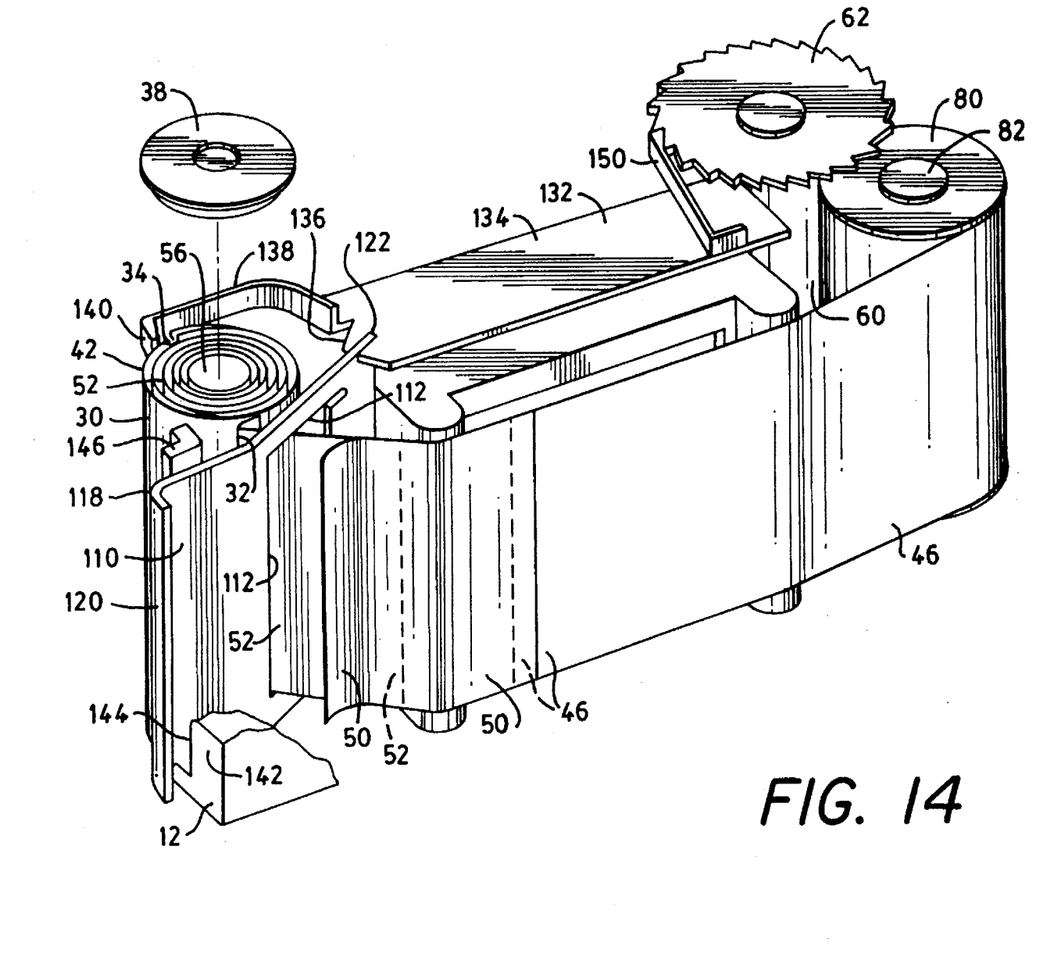
FIG. 14 is a perspective view of the film pad strip container, latch, stirrup, meter roll and ratchet wheel components in operation.

The pad 52, at one end 54, extends through the can opening 32 and is fixed to the foil 50 (FIG. 4). In operation of the camera, the film strip 46 is unwound from the external surface 42 of the can 30 and is drawn toward the film plane or exposure area 26. After exposure of the last frame of film, further drawing of film from the can causes rotation of the can 30 and pulls the foil 50 from the can opening 32, to unseal the can interior and expose the pad 52 to the atmosphere (FIG. 14). While the pad is subject to deterioration if exposed to the atmosphere prior to use, the foil, until pulled from the opening 32, serves to seal the can 30 and protect the pad 52 stored therein from the atmosphere. Once the film strip 46 has left the external surface 42 of the can 30, the groove 34 is uncovered or left exposed.

Figure 7:
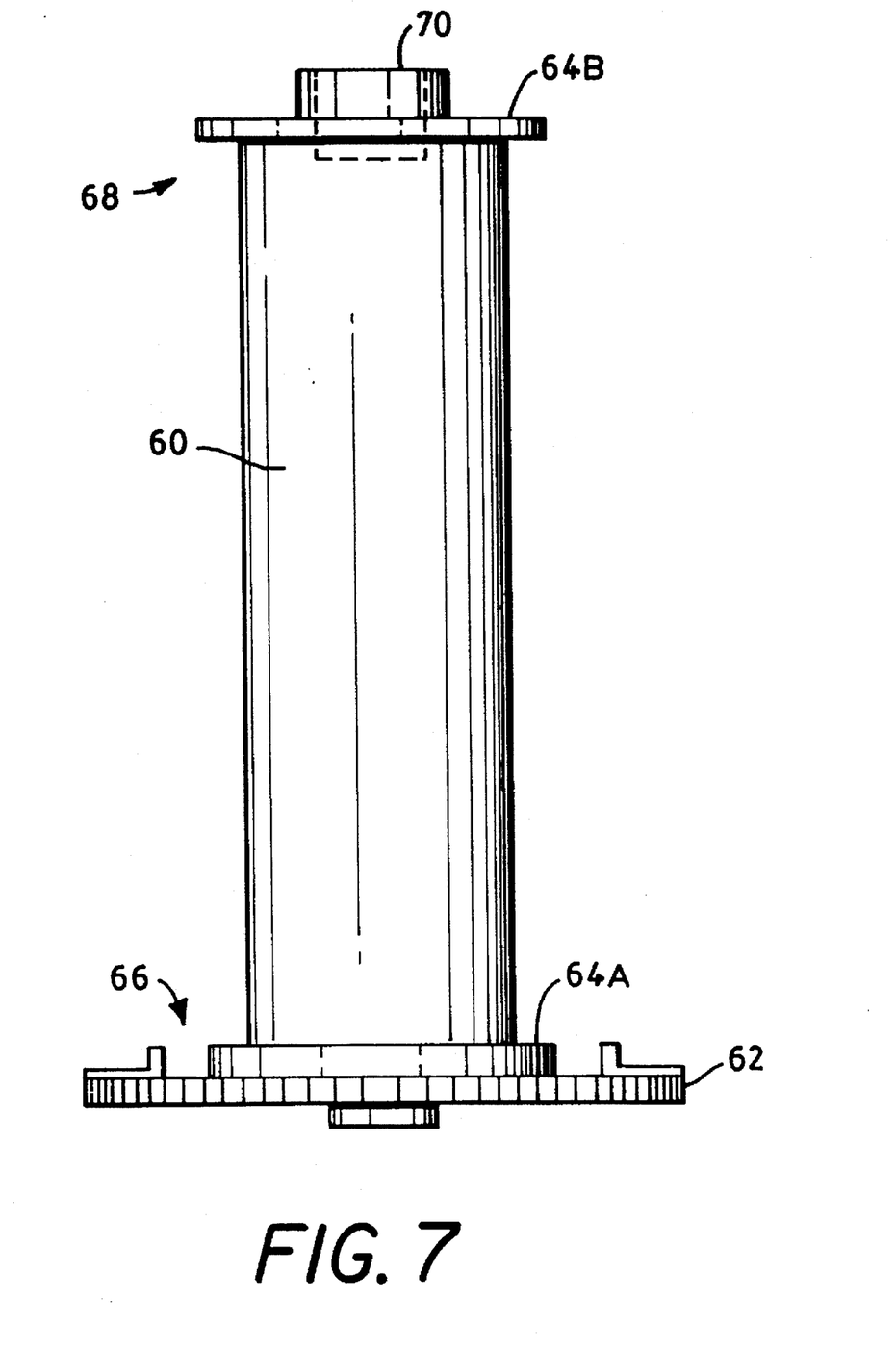
FIG. 7 is a side elevational view of a film take-up roll component of the camera.

A take-up reel 60, having a film advance wheel in the form of a ratchet wheel 62 at one end thereof, is rotatably mounted in the camera and serves to pull the film strip 46 off the can 30 and advance the film to the exposure area 26. The ratchet wheel 62 is in part exposed to the exterior of the camera (FIG. 1). The take-up reel 60, as shown in FIG. 7, is a cylindrically-shaped reel having flanges 64A and 64B at opposite ends thereof. At a first end 66, the ratchet wheel 62 is attached to the flange 64A, and at a second end 68, the flange 64B is provided with a journal 70 adapted to receive another journal (not shown) which may be molded into the inside surface of the front wall of the camera 10.

In operation, the exposed portion of the ratchet wheel 62 is manipulated by an operator to turn the take-up reel 60 to pull the film strip 46 off the external surface 42 of the can 30, into the exposure area 26, and thence onto the take-up reel 60, where the exposed film is stored until the operator is ready to have the film developed.

Figure 8:
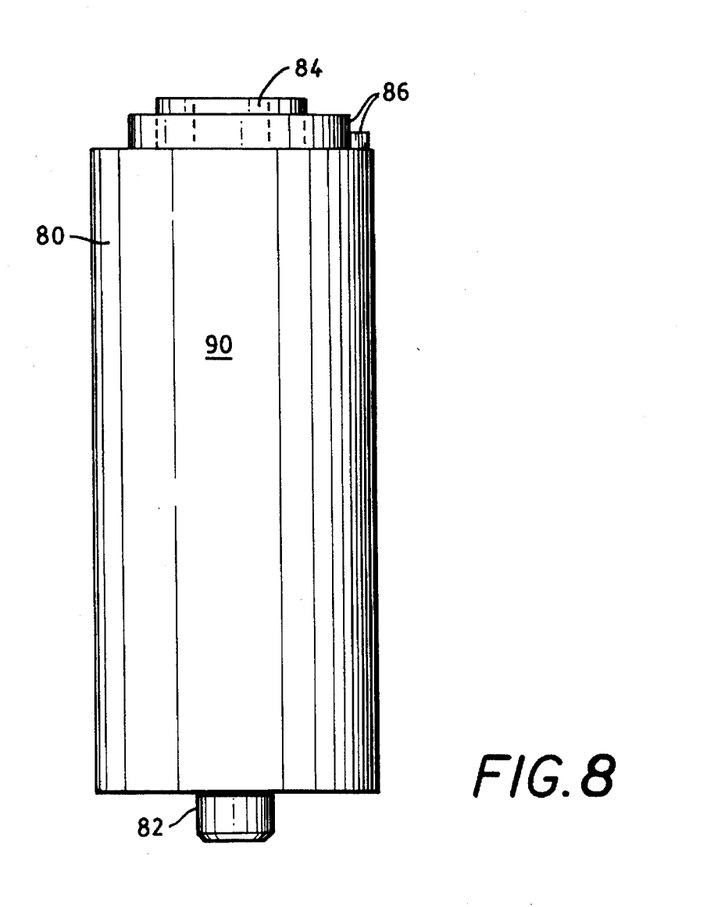
FIG. 8 is a side elevational view of a meter roll component of the camera.
Figure 9:
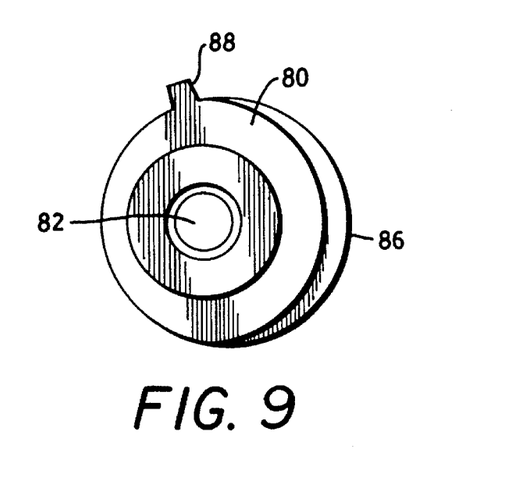
FIG. 9 is an end elevational view of the meter roll component of FIG. 8.

Rotatably mounted in the camera is a meter roll 80 (FIGS. 4, 8 and 9). The meter roll 80 is a cylindrically-shaped roll having at one end thereof a journal 82 and at the other end thereof a journal bearing 84, for rotatably supporting the roll 80. Disposed around the journal bearing 84 is a cam surface 86 and a detent 88.

In operation, the film strip 46, after leaving the exposure area 26, winds around the meter roll 80 and onto the take-up reel 60. The meter roll 80 is provided with a high-friction elastomeric coating 90 which transfers the movement of the film strip 46 thereover into rotational movement of the meter roll. Rotation of the meter roll 80 is accompanied by rotational movement of the detent 88 which, after movement of an appropriate segment of the film strip 46 from the exposure area 26, encounters a stop lug 100 on a shutter recock mechanism 102 (FIGS. 19–22), which will be further described hereinbelow. When rotation of the meter roll 80 is stopped by engagement of the detent 88 with the stop lug 100, there is resistance to turning of the ratchet wheel 62, inasmuch as the film is frictionally discouraged from sliding over the meter roll 80, signalling the operator that the film strip 46 is properly placed for another exposure.

Figure 10:
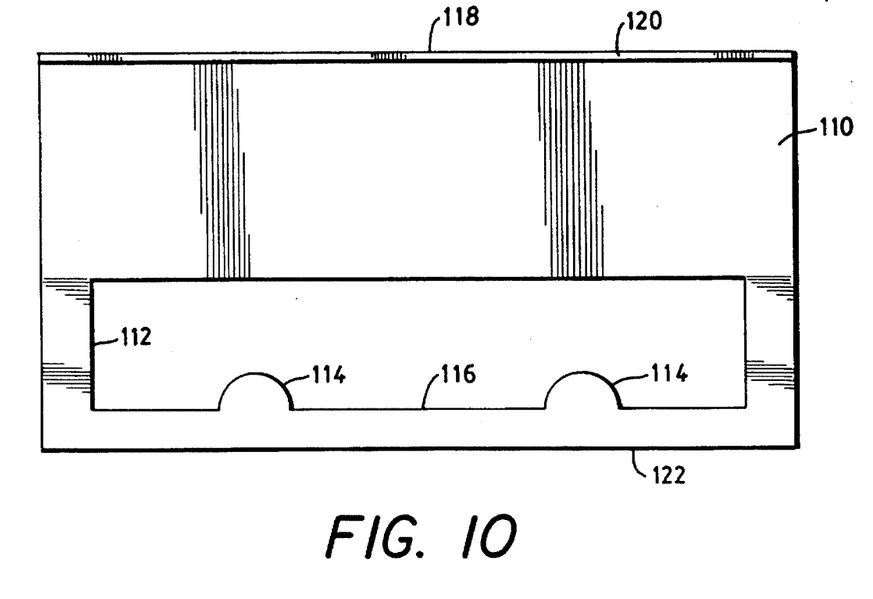
FIG. 10 is a top plan view of a stirrup component of the camera.
Figure 11:
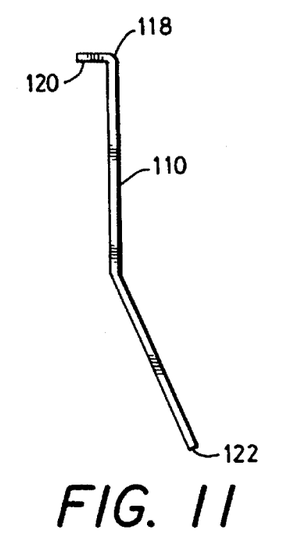
FIG. 11 is a side elevational view of the stirrup component of FIG. 10.
Figure 12:
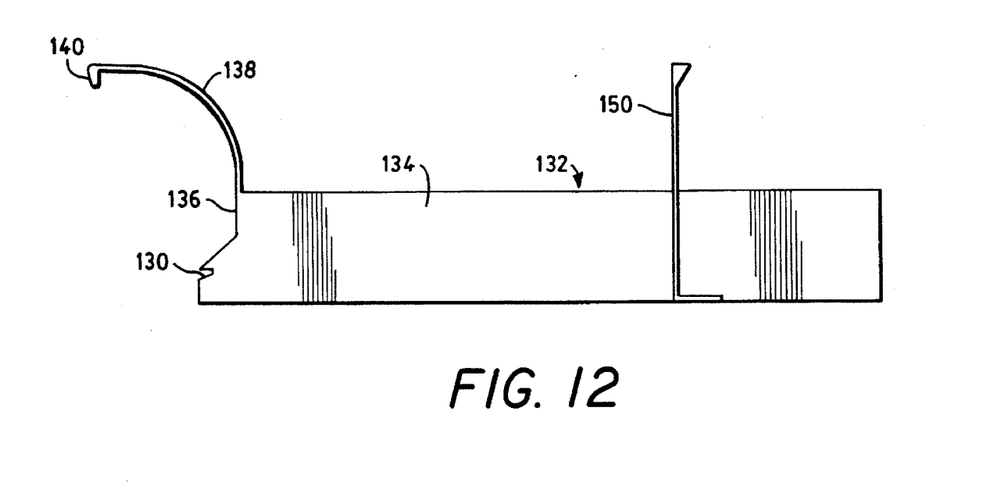
FIG. 12 is a side elevational view of a latch component of the camera.
Figure 13:
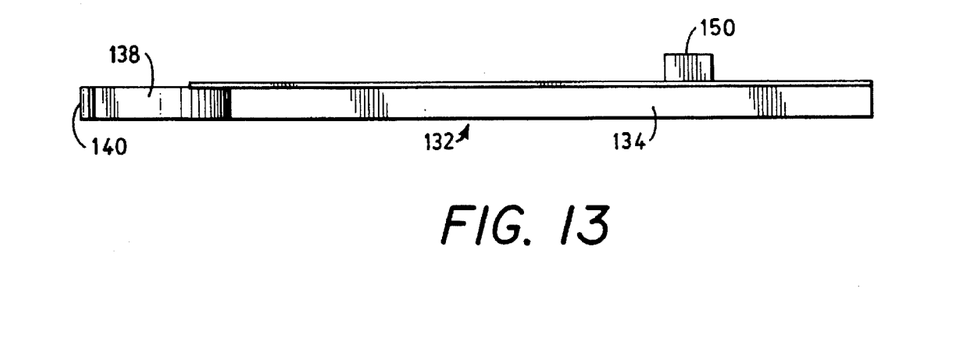
FIG. 13 is a bottom view of the latch component of FIG. 12.

Referring to FIGS. 3, 4, 10, 11, and 14, it will be seen that a stirrup member 110 is disposed adjacent the can 30. The stirrup member 110 is a rigid member, preferably of metal, and having an opening 112 therein (FIGS. 10 and 14). Teeth 114 extend into the opening 112 from a trailing edge 116 of the opening. A forward edge 118 of the stirrup member 110 is provided with a grip portion 120 by which the stirrup member 110 may be grasped by an operator. The stirrup member 110 is provided with a rear edge 122 engaged in a notch 130 of a latch member 132, to be described hereinafter. As the film strip 46 is drawn from the can 30, toward the exposure area 26, the film strip passes through the opening 112 in the stirrup member 110. Upon movement of the end 48 of the film strip 46 from the can 30, the foil 50 is drawn through the stirrup member opening 112, from left to right as seen in FIG. 4.

The aforementioned latch member 132 (FIGS. 3, 12, 13 and 14) comprises a rigid bar 134 having a forward edge 136 with the notch 130 therein. At or near the forward edge 136 of the bar 134 is a forwardly-extending leaf spring 138 having a hook 140 on a distal end thereof. The leaf spring 138 biases the hook 140 into engagement with the film strip 46 rolled on the external surface 42 of the can 30. When the film strip has been unwound from the can external surface 42, the leaf spring 138 urges the hook 140 into engagement with the can groove 34. Thereafter, continued rotation of the can 30 pulls the latch member 132 leftwardly, as viewed in FIG. 3, to push the stirrup member 110 leftwardly.

Figure 15:
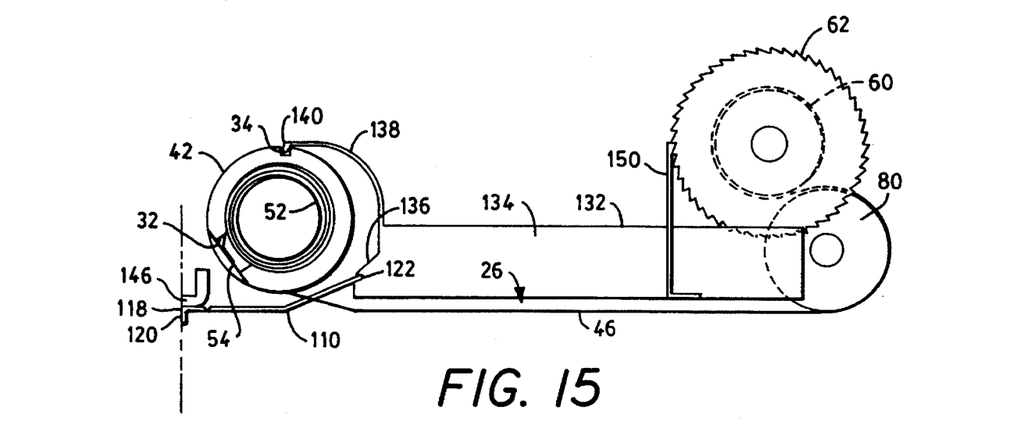
FIGS. 15–17 are diagrammatic representations of working components of the camera in different stages of film manipulation.
Figure 16:
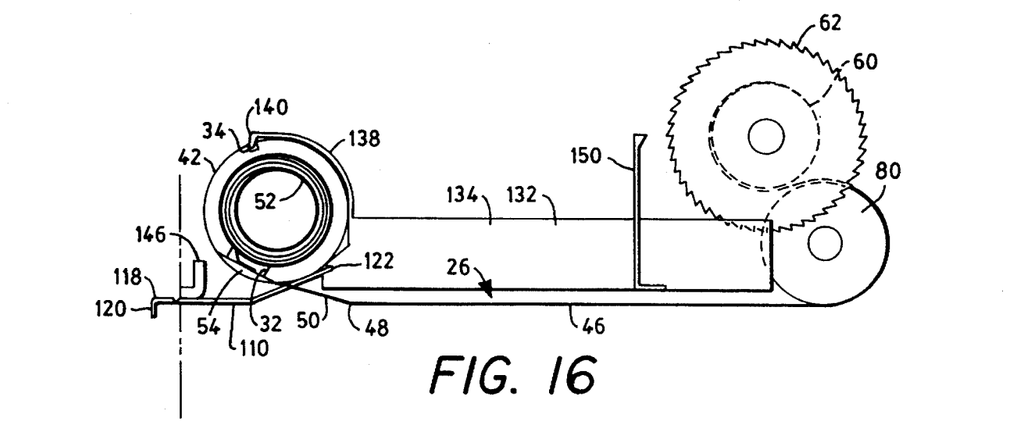

Referring to FIGS. 3 and 15, it will be seen that the stirrup member forward edge 118 extends through a slot 144 and just beyond a camera wall 142. Adjacent the slot 144 is a wiper member 146, which may be of felt or elastomeric material. Leftward movement of the latch member 132, as viewed in FIGS. 3 and 15, serves to push the stirrup member further leftwardly, so as to cause the forward edge 118 of the stirrup member to extend further from the camera wall 142 and expose the grip portion 120 of the stirrup member, such that the grip portion may be grasped by an operator (FIG. 16).

Figure 17:
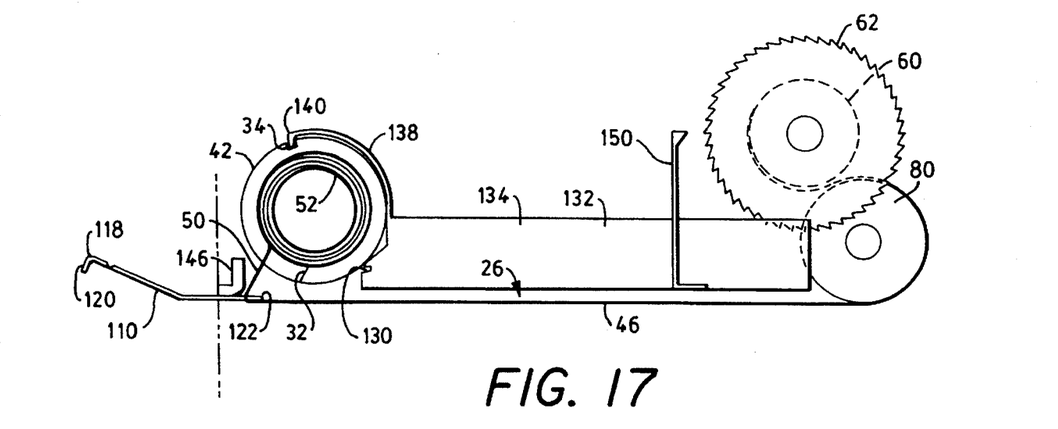
Figure 18:
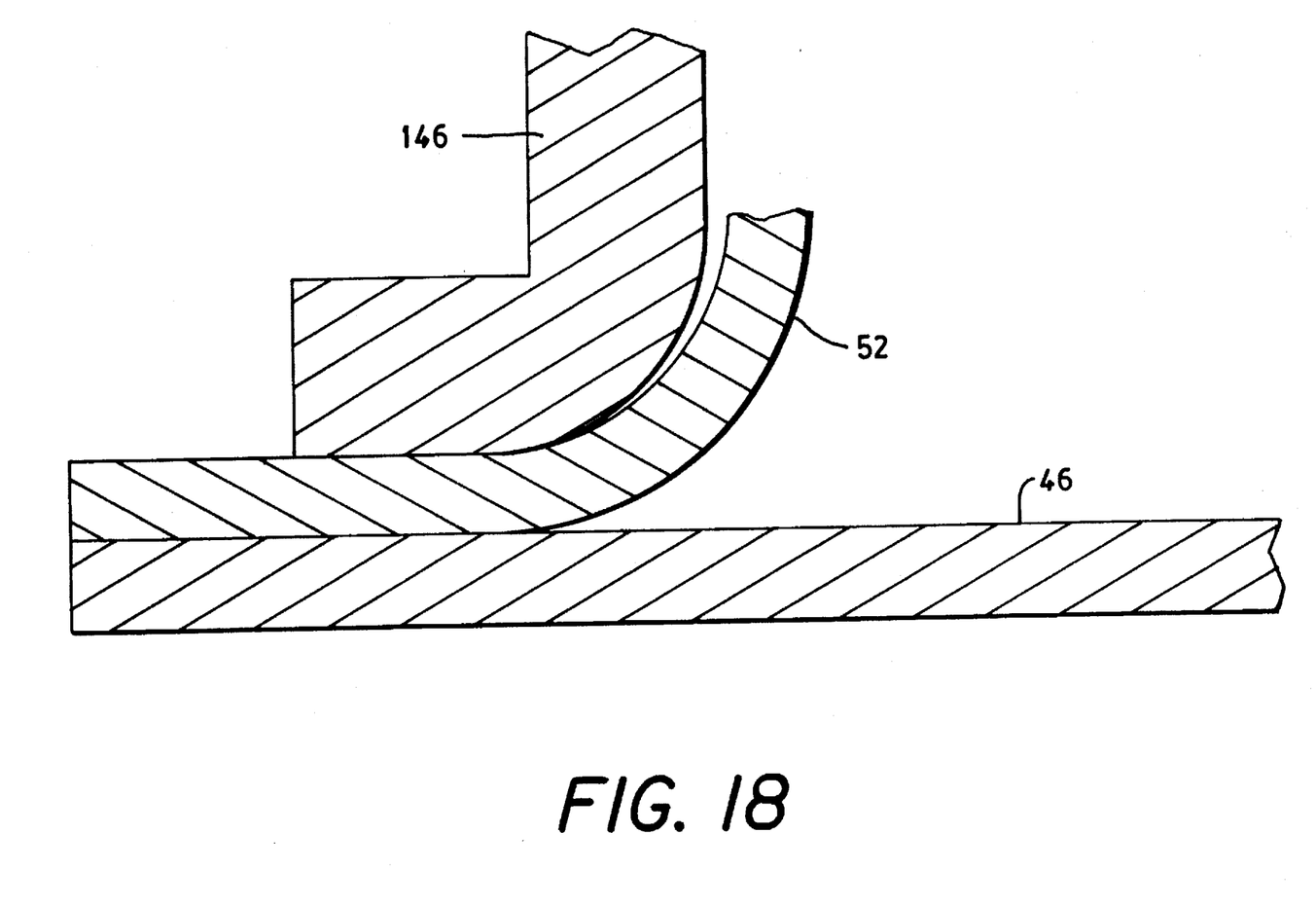
FIG. 18 is a diagrammatic representation of the film in a processing stage.

In operation, the operator grasps the grip portion 120 of the stirrup member 110 and pulls the stirrup member leftwardly, as reviewed in FIG. 17, or away from the camera. As shown in FIG. 17, pulling of the stirrup member 110 causes the foil to double over around the stirrup member opening trailing edge 116, the foil 50 having been impaled on the teeth 114 of the stirrup member 110. Continued pulling on the stirrup member 110, causes the film strip 46 and the pad strip 52 to exit through the slot 144 in the camera wall 142 with the pad strip 52 overlying the exposed film strip 46, as shown in FIG. 18. The wiper member 146 presses the pad strip 52 firmly onto the film strip 46, to combine the strips 46, 52 into a single or integral laminate strip.

Referring to FIGS. 3 and 15-17, it will be seen that the latch member 132 has fixed thereto a pawl 150 adapted to engage the ratchet wheel 62 to prevent the ratchet wheel and take-up reel 60 from rotating in a film release direction. In the course of the picture-taking usage of the camera, the ratchet wheel 62 and take-up reel 60 move only clockwise, as viewed in FIGS. 3 and 15-17, to unwind the film strip 46 from the can 30, through the exposure area 26, around the meter roll 80, and onto the take-up reel 60. However, when the latch member hook 140 engages the can groove 34, causing the latch member 132 to move leftwardly, as viewed in FIGS. 3 and 15-17 of the drawings, the movement of the latch member 132 serves not only to push the stirrup member 110 out of the slot 144, but further serves to remove the pawl 150 from the ratchet wheel 62, permitting rotative movement of the take-up reel 60 in a counter-clockwise film strip release direction.

As noted above, the turning of the meter roll 80 so as to precisely align an appropriate segment of the film strip 46 with the exposure area 26 is controlled by the interaction of the meter roll 80 and the shutter recock mechanism 102. In FIGS. 19-22, there is illustrated the structure and operation of the recock mechanism 102 and its association with the meter roll 80.

Figure 19:
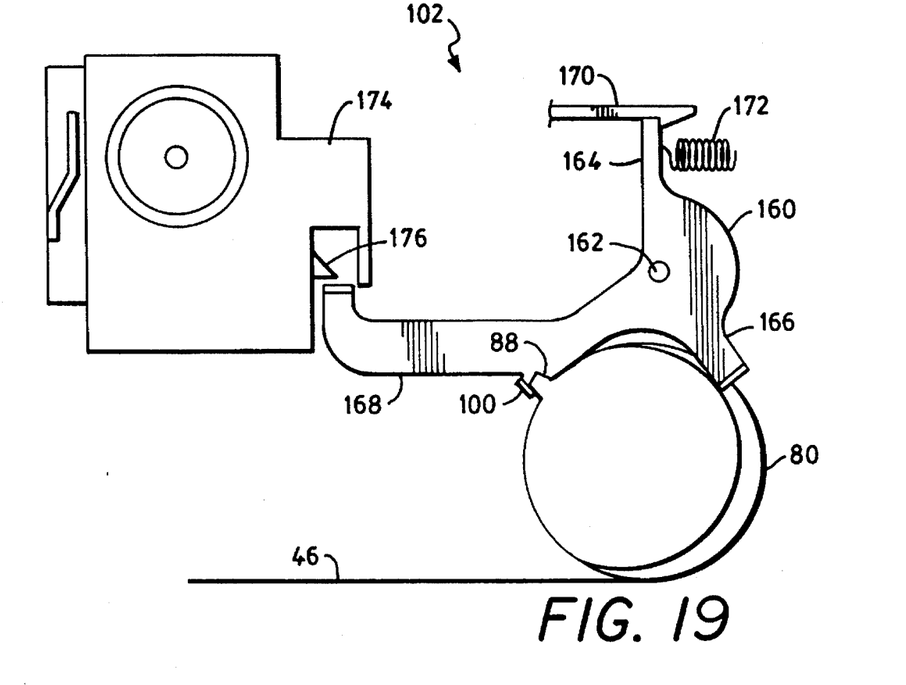
FIGS. 19–22 are elevational and partly diagrammatic views illustrative of a shutter recock mechanism structure and operation.
Figure 20:
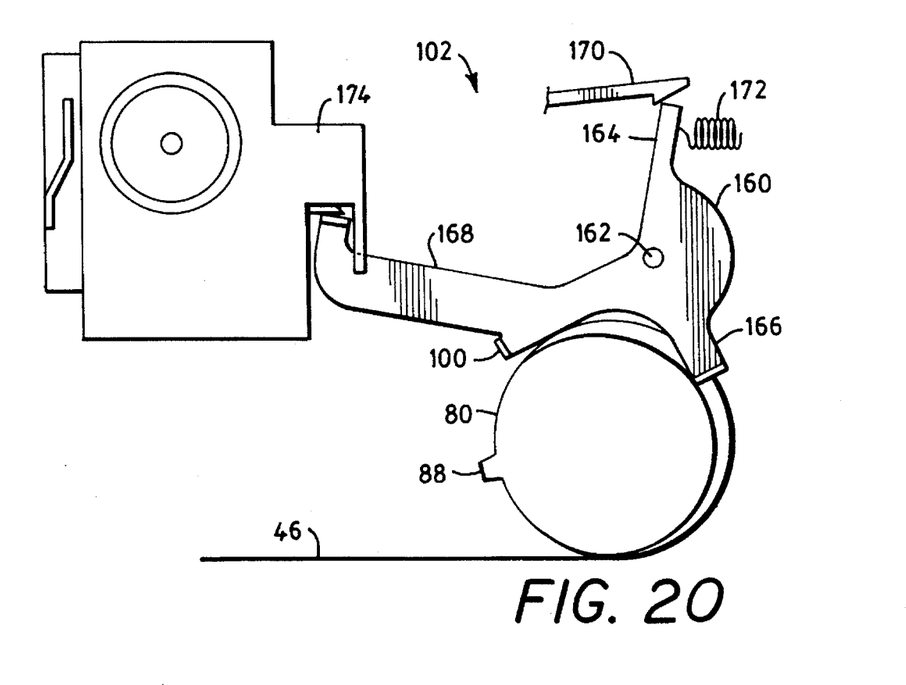

In FIG. 19, there is shown a hammer 160 pivotally mounted on a pin 162. The hammer 160 includes the stop lug 100, a release arm 164, a recock arm 166, and a shutter blade actuator arm 168. In the position shown in FIG. 19, the release arm 164 is engaged with a release button 170 by which an operator triggers exposure of a segment of the film strip 46. The release arm 164 is biased clock-wise, as viewed in FIGS. 19-22, by a spring means 172. Positioned proximate the hammer 160 is a shutter assembly 174 actuated by a shutter blade 176 extending from the shutter assembly.

Upon actuation of the release button 170, the release arm 164 is released and, in response to the bias of the spring means 172, rotates with the remainder of the hammer 160 in a clockwise direction around the pin 162. Such rotation moves the actuator arm 168 into engagement with the shutter blade 176 to trip the shutter and expose the segment of the film strip 46 disposed in the exposure area 26. Simultaneously, the stop lug 100 moves away from meter roll detent 88, to permit counter-clockwise movement of the meter roll 80 (FIG. 20), and thereby permit clockwise rotation of the take-up reel 60 (FIGS. 15-17).

Figure 21:
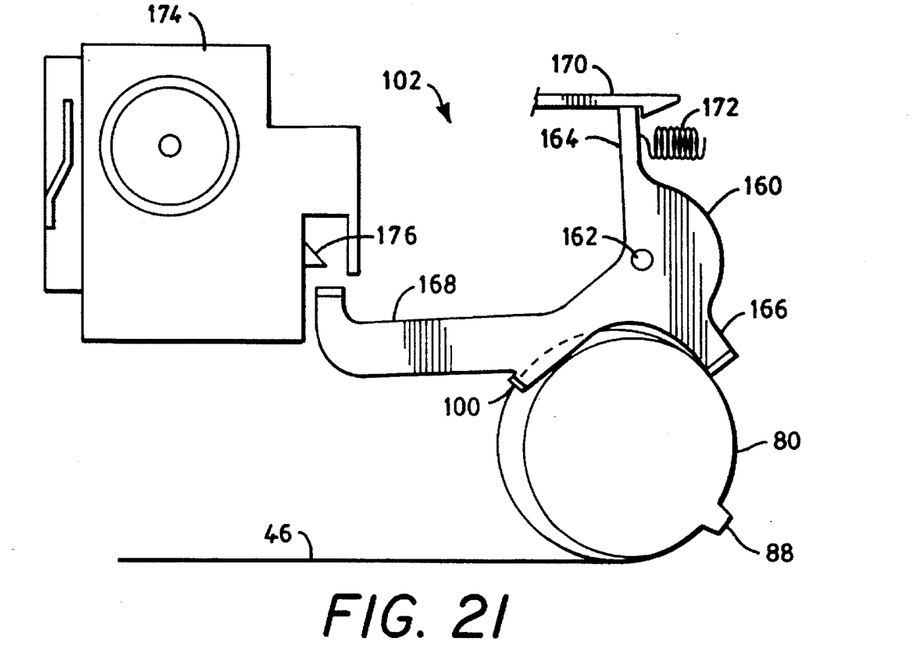
Figure 22:
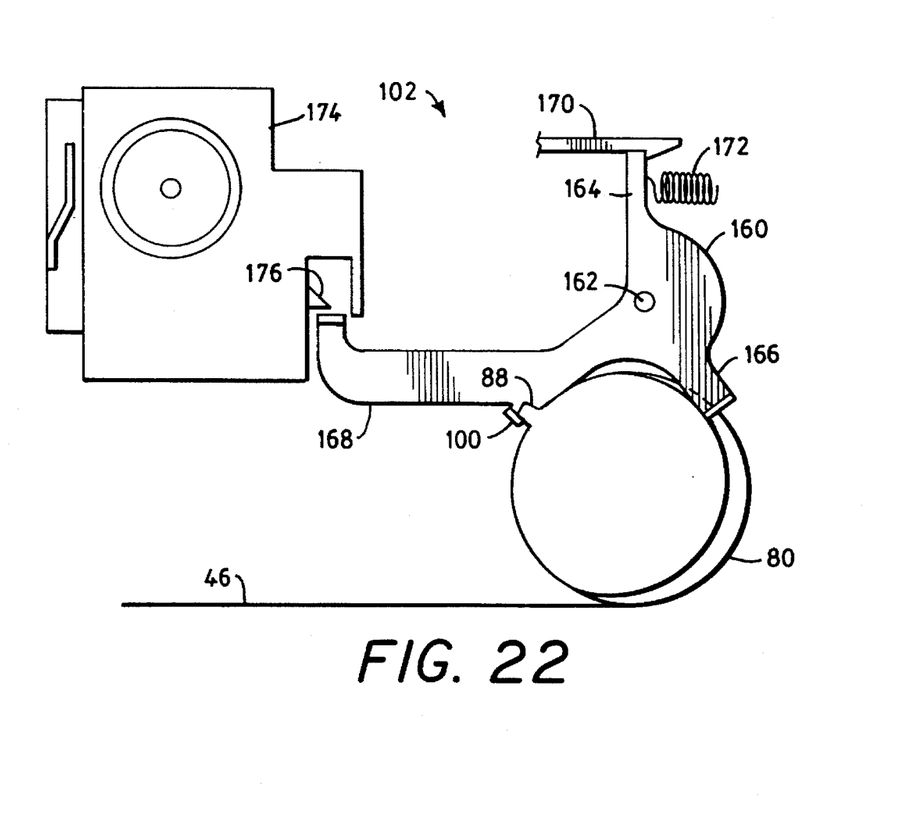

The operator then engages the exposed portion of the ratchet wheel 62 (FIG. 1) to turn the ratchet wheel and thereby the take-up reel 60, to move the just exposed film segment from the exposure area 26 and unwind another segment of the film 46 from the can 30 and into the exposure area. Turning of the meter roll 80 turns the cam surface 86 (FIG. 9) of the meter roll, which abuts the recock arm 166 and rotates the hammer 160 to a recock position, as shown in FIG. 21, wherein the release arm 164 is again captured by the release button 170 and the actuator arm 168 is spaced from, but positioned to engage, the shutter blade 176. After further rotation of the meter roll 80 (FIG. 22), the detent 88 engages the stop lug 100 to stop rotation of the meter roll and thereby stop further advancement of the film strip 46. In this position, the shutter recock mechanism 102 is set to initiate another exposure of film, and the film is properly located in the exposure area 26.

As noted hereinabove, after exposure of the last segment of film, the can 30 is opened and the exposed film strip 46 and the theretofore protected processing pad 52 are withdrawn from the camera simultaneously, with the pad 52 overlying the film strip 46 and the pad pressed into firm engagement with the film strip.

Within a few seconds after the now integrated or combined strips 46, 52 are pulled from the camera, images develop, side by side, along the length of the pad strip. The operator need not apply any developing or protective composition to the film.

Thus, there is provided a camera having means for processing the film therein, the processing means being applied to the exposed film evenly and consistently, and without handling of the processing composition by the operator. There is further provided means for sealing the processing composition until immediately prior to use. The camera thus provided requires of the operator only that he grasp the aforementioned grip portion 120 and pull the stirrup member 110 in a direction outwardly from the camera 10. The camera 10 is simple in structure and operation and is therefore inexpensive to make and use.

It is to be understood that the present invention is by no means limited to the particular construction herein disclosed and/or shown in the drawings, but also comprises any modification or equivalents within the scope of the claims.

Having thus described my invention, what I claim and desire to secure by Letters Patent of the United States is:

1. A camera comprising a housing, a cylindrically-shaped container mounted in said housing for rotative movement, said container having an external surface for supporting a roll of film strip thereon, and an internal surface for retaining a roll of film processing pad strip therein, a seal member interconnecting said film strip and said pad strip, said container having an elongated opening extending lengthwise thereof, said seal member being fixed to said container so as to cover said opening and seal said pad strip in said container, said seal member being peelable from said container by movement of an end of said film strip from said external surface of said container and said pad strip from within said container through said opening, as said film is moved away from said housing.

2. A camera comprising a housing, a generally cylindrically-shaped container rotatably mounted in said housing, said container having an elongated opening extending lengthwise of said container, said container having an external surface for supporting a negative film strip and an internal surface for retaining a rolled film processing pad strip, an end of said film strip and an end of said processing pad strip being fixed to a seal member having adhesive thereon for holding said seal member on said container external surface and for covering said elongated opening to seal said container, said seal member being adapted to be peeled from said container and from said opening by pulling of said film strip from said container, movement of said seal member away from said camera being operative to draw said processing pad strip from said container and from said camera while simultaneously drawing said film strip in exposed condition from said camera, with said pad strip overlying said film strip.

3. The camera in accordance with claim 2 wherein said camera further comprises a slot in a wall of said housing, said slot being configured to permit passage of said seal member, said processing pad strip, and said negative film strip in exposed condition therethrough.

4. The camera in accordance with claim 3 wherein said camera further comprises a stirrup member disposed adjacent said container, said stirrup member having an opening therein through which passes said film strip toward an exposure location in said camera.

5. The camera in accordance with claim 4 in which said container is provided with an elongated groove extending lengthwise in said container external surface, said camera further comprising a latch engaged with said stirrup member and having an arm engageable with said groove when said groove is exposed by removal of said negative film strip from said external surface of said container, rotational movement of said container after engagement of said groove by said arm being operative to move said latch in a direction toward said camera wall slot to move said stirrup member in said camera wall slot.

6. The camera in accordance with claim 5 wherein said engagement of said latch with said stirrup member urges said stirrup member through said camera wall slot, said seal member being engaged by said stirrup member, such that said movement of said stirrup member through said slot moves therewith said seal member, and thereby said exposed film strip and said processing pad strip.

7. The camera in accordance with claim 6 wherein said stirrup member is provided with teeth extending inwardly of said stirrup member opening from a trailing edge of said opening, said teeth being configured to engage and puncture said seal member, such that said stirrup member locks into said seal member upon said movement of said stirrup member through said camera wall slot.

8. The camera in accordance with claim 7 wherein said stirrup member is provided with a grip portion, by which an operator may pull said exposed film from said camera and therewith said processing pad strip from said container and from said camera.

9. The camera in accordance with claim 8 further comprising a wiper member defining an edge of said camera housing slot, said wiper member bearing against said processing pad strip as said processing pad strip exits said slot with said exposed film strip, to press said pad strip onto said film strip to provide a laminate strip including said pad strip and said film strip.

10. The camera in accordance with claim 6 comprising a film take-up reel having a film advance wheel fixed to one end thereof, said take-up reel being operative to pull said negative film strip from said container, to position a portion of said negative film strip in a film exposure area in said camera, and to move said film strip portion from said exposure area onto said take-up reel.

11. The camera in accordance with claim 10 wherein said film advance wheel comprises a ratchet wheel, and further including a pawl fixed to said latch and adapted to engage said ratchet wheel to permit rotative movement of said ratchet wheel, and thereby said take-up reel, in only one direction in which film is moved from said container to said take-up reel.

12. The camera in accordance with claim 11 and further comprising a meter roll, said meter roll supporting said film strip between said exposure area and said take-up reel and having a protrusion on the periphery thereof engageable with a shutter recock hammer member to limit movement of said film strip over said exposure area to a single selected increment of length of said film strip.

13. The camera in accordance with claim 12 wherein said meter roll is provided with an elastomeric surface for frictional engagement with said film strip.

14. The camera in accordance with claim 11 wherein said movement of said latch toward said camera wall slot causes movement of said pawl from engagement with said ratchet wheel, such that rotative movement of said take-up reel in a direction releasing said film strip from said take-up reel is permitted.

15. In combination, a container, a first strip of first material, and a second strip of second material, said first material being of a composition for reacting with said second material when said first and second strips are joined together, said first material composition being subject to rapid deterioration when exposed to the atmosphere, said container comprising a cylindrically-shaped housing having a wall with an external surface for supporting said second strip rolled thereon, and an internal surface for containing said first strip in a rolled condition therein, said container having an elongated slot in said wall extending lengthwise of said container, and a seal member, a trailing end of said second strip and a leading end of said first strip being fixed to said seal member, said seal member being adhesively fixed to said external surface and covering said slot so as to seal said first strip within said container, whereby upon rotation of said container, said second strip is unwound therefrom and upon departure of said trailing end of said second strip from said container said seal member peels from said external surface to open said slot and, upon continued movement of said second strip from said roll, said leading end of said first strip is drawn through said slot, followed by the remainder of said first strip, for joining of said first and second strips one upon the other.

* * * * *